United States Patent von Allwörden et al.

[11] 4,108,464
[45] Aug. 22, 1978

[54] COUPLING HOOK FOR A THREE-POINT ATTACHMENT OF A TRACTOR

[75] Inventors: Wilhelm von Allwörden, Erbach i.O, Fed. Rep. of Germany; Dieter Kunze, Clarendon Hills, Ill.

[73] Assignee: Jean Walterscheid GmbH, Lohmar, Fed. Rep. of Germany

[21] Appl. No.: 777,089

[22] Filed: Mar. 14, 1977

[30] Foreign Application Priority Data

Apr. 27, 1976 [DE] Fed. Rep. of Germany ....... 2618332

[51] Int. Cl.² .............................................. B60D 1/10
[52] U.S. Cl. ..................................... 280/508; 280/509
[58] Field of Search .......... 280/508, 509, 510, 461 A, 280/446 A

[56] References Cited
U.S. PATENT DOCUMENTS 3,539,203  11/1970  Baugh .................................. 280/509
3,977,698  8/1976  Allworden ...................... 280/461 A
4,014,562  5/1977  Kunze ................................... 280/509

*Primary Examiner*—Robert R. Song
*Attorney, Agent, or Firm*—Edmund M. Jaskiewicz

[57] ABSTRACT

A coupling hook has a latch element extending from a pocket through a passage to block a coupling pin in the hook opening in the locked position. The latch element is arcuate and has opposed curvilinear surfaces one of which is engageable with a fulcrum in the vicinity of an opening in the pocket through which an actuating lever of the latch element extends. The other curvilinear surface is engageable with a fulcrum in the vicinity of the passage and has a notch engageable with a bolt in the pocket in the locked position of the latch element. The latch element may be displaced to a release position either by lifting and then pulling the actuating lever or by a coupling pin engaging the curved end of the latch element to urge the latch element to a released position.

5 Claims, 3 Drawing Figures

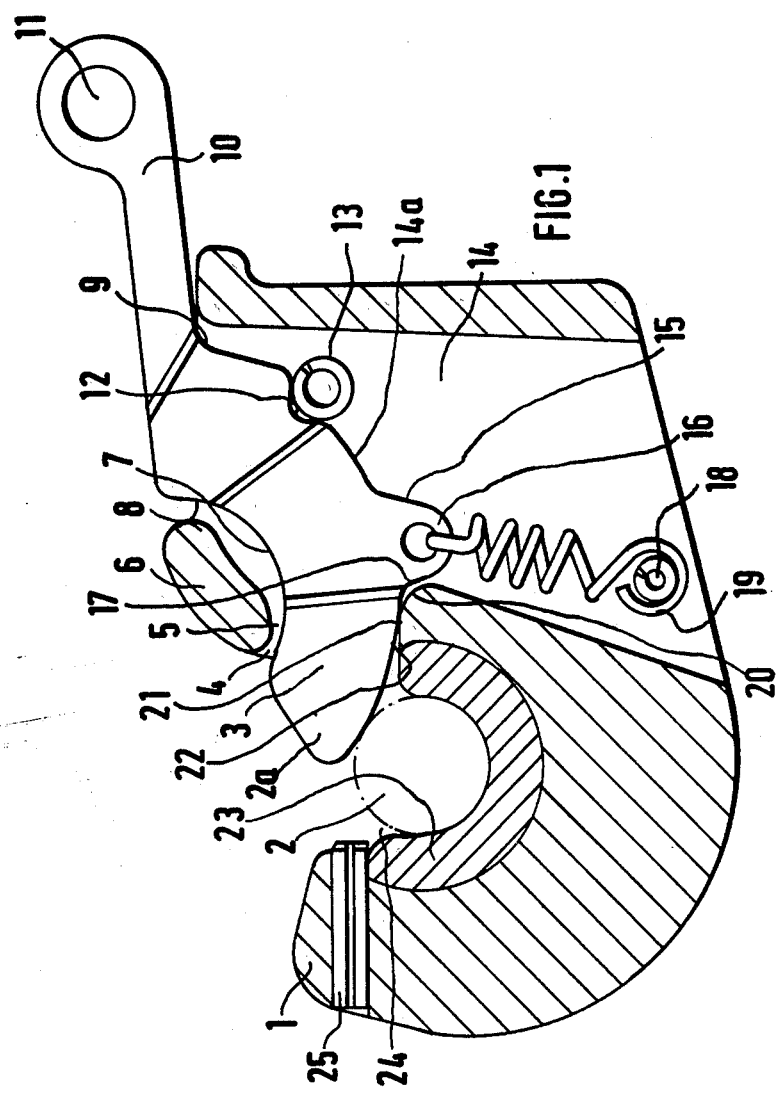

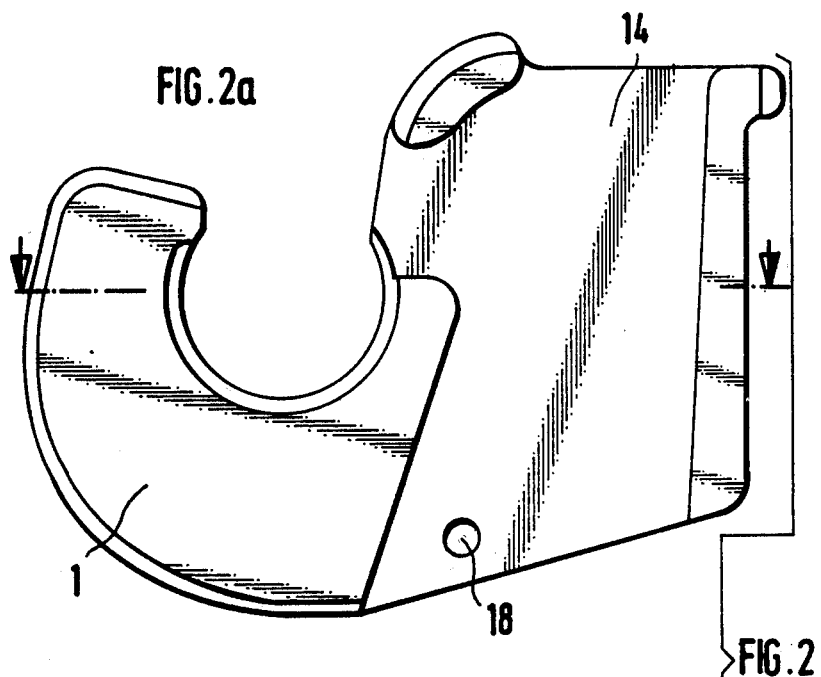
FIG. 2a
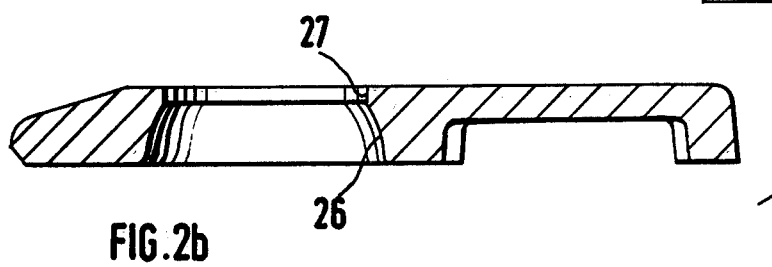
FIG. 2b
FIG. 2

COUPLING HOOK FOR A THREE-POINT ATTACHMENT OF A TRACTOR

The present invention relates to a coupling hook for a three-point attachment of an agricultural tractor, more particularly, to a locking element for retaining a coupling pin in the hook opening or jaw of the coupling hook.

The coupling hook of a three-point attachment on agricultural tractors and the like is generally provided with a locking mechanism for securing a coupling pin on an implement to be coupled within the hook opening or jaw of the hook. Such a locking mechanism has comprised a spring-loaded latch which projects from a pocket in the hook through a passage in the direction toward the hook opening so as to block a coupling pin in the opening.

One form of a snap-closure locking mechanism is disclosed in the German Pat. No. 1,273,890 and comprises a locking element which is maintained in its closed position by a compression spring and is displaceable into the released position by a linkage which is actuated by the tractor operator while seated on the tractor. The locking element, which has an arcuate configuration and is mounted in arcuate guides, is urged by a compression spring in the direction toward the hook opening. However, this locking mechanism has the distinct disadvantage that the locking element cannot be linearly actuated by traction forces without jamming or wedging in its guides. In addition, this locking mechanism does not include any structure to prevent unintentional opening of the lock which may be caused by pivoting movements of the coupling pin on the attachment implement. Further, any self-locking or self-braking effect which might possibly be derived from the particular configuration of the locking element would also significantly impede the unlocking of the mechanism when the locking element is pulled.

A rectilinear or straight spring-loaded locking element has the same disadvantages with respect to the absence of any safety provisions to prevent accidental disengagement of the coupling pin from the coupling hook. This form of locking pin has the additional disadvantage that linear displacement of the locking element will require the application of considerable force in the event that the coupling pin is jammed or wedged within the coupling hook.

In other forms of locking mechanisms for coupling hooks which are provided with structure for preventing accidental disengagement, and such as shown in German PS No. 1,226,501, German PS No. 1,263,380, and German OS No. 1,557,795, at least two components are required in each case including a locking element for the coupling pin and a lever for blocking the locking element to prevent its accidental disengagement.

It is therefore the principal object of the present invention to provide a novel and improved locking mechanism for a coupling hook of a three-point attachement of a tractor.

It is another object of the present invention to provide such a locking mechanism for a coupling hook which comprises a minimum of components but is completely functional to prevent accidental opening or disengagement of the locking mechanism when subjected to vibrating and pivoting coupling pins.

It is a further object of the present invention to provide such a coupling hook locking mechanism which can be readily actuated by the tractor operator from his seat even in the event should the coupling pin become jammed or wedged.

It is an additional object of the present invention to provide such a locking mechanism for a coupling hook which is simple in construction, has ease and reliability in operation and can be manufactured at a relatively low cost.

According to one aspect of the present invention a coupling hook for a guide member of a three-point attachment of a tractor may comprise a hook member having a passage between the hook or jaw opening and a pocket which opens to a surface of the hook member. An arcuate latch element is displaceable into the hook opening through the passage to block a coupling pin in the hook opening in a locked position and displaceable to a position to release the coupling pin. An actuating lever projects outwardly from the latch element through the pocket opening. The latch element has opposed curvilinear surfaces one of which is engageable with a first fulcrum in the vicinity of the pocket opening and the other curved surface engageable with a second fulcrum in the vicinity of the passage. A notch in the outer curvilinear surface of the latch element is engageable with a bolt within the hook member pocket. The notch engages the bolt and the outer curvilinear surface engages the second fulcrum when the latch element is in its locked position.

The latch element may also be provided with means for limiting the displacement of the latch element to the locking and release positions and a spring may be provided to urge the outer curved surface against the second fulcrum and the notch against the locking bolt when the latch element is in the locked position.

The present invention has the advantage as compared with known locking mechanisms that the latch element and actuating lever form a single component or unit which locks the coupling pin of the implement in position in the coupling hook. The latch element itself is secured against accidental disengagement which might result from pivoting or vibrating of the coupling pin. The actuating lever together with the latch element is pulled by a tension spring into the operative locked position. The particular arcuate confirmation of the latch element and the disposition of the latch element in the pocket of the hook assures that locked coupling pins will remain locked since any forces applied by the pins which would tend to disengage the locking mechanism will actually produce a force in the direction opposite to that of releasing displacement so as to prevent effectively all possibility of accidental disengagement.

The integral construction of the latch element and actuating lever represents a substantial simplification for manufacturing operations and also significantly reduces production costs. The actuating lever is provided with a relatively long lever arm which thus requires comparatively little force to open the lock mechanism. As result, jammed or wedged coupling pins can be readily disengaged or released from the tractor operator's seat. Disengagement of the latch element from the coupling pin is also considerably facilitated by the rocking effect present at the fulcrum points for the latch element. The latch element undergoes a curvilinear opening movement which enables the latch element to move tangentially over the coupling pin and at the same time the latch element is withdrawn radially away from the coupling pin. Such a release movement is distinctly advantageous as compared with the purely tangential release movement present in conventional and known locking mechanisms.

Other objects and advantages of the present invention will be apparent upon reference to the accompanying description when taken in conjunction with the following drawings, which are exemplary, wherein:

FIG. 1 is a longitudinal sectional view of a coupling hook according to the present invention; and FIG. 2 is an elevational view looking at the interior of a forged half of the hook member showing the pocket and a sectional view thereof taken in the direction of the arrows as illustrated.

Proceeding next to the drawings wherein like reference symbols indicate the same parts throughout the various views a specific embodiment and modifications of the present invention will be described in detail.

As may be seen in FIG. 1, the coupling hook comprises a hook member 1 having a hook opening or jaw 24 in which is positioned a partially spherical member 23 having a slot therein to receive a coupling pin 2 on an implement to be coupled and mounted within the hook opening. Also within the hook member 1 is a pocket 14 which communicates through a passage 5 with the hook opening 24 and which is provided with an opening 9 on the upper surface of the hook member. A portion of the hook member between passage 5 and pocket opening 9 forms a support or bearing surface 6 whose lower surface comprises a guide face 4 opening to passage 5 and whose upper portion is provided with a fulcrum 8 in the vicinity of the pocket openng 9.

A latch element 3 having arcuate configuration has a nose or front end 2a which extends through the passage 5 into the hook opening 24. An actuating lever 10 having a traction eye 11 is integral with the latch element 3 so as to be rigidly attached thereto and projects outwardly from the pocket 14 through the passage opening 9 in a direction away from the hook opening 24. The arcuate latch element 3 has an inner curvilinear surface 7 which is positioned adjacent the guide face 4 and the fulcrum 8. The latch element also has an outer curvilinear surface the forward portion of which extending from nose 2a to a stop 17 is an operative lock-releasing surface 22 positioned opposite the fulcrum 21 and a stop surface 20 which is engageable with stop 17. The stop 17 is formed by one side of a projection 16 whose other side 15 also defines an end stop. The projection 16 is provided with an opening to which is attached one end of a spring 19 whose other end is attached to a spring mounting pin 18 in the lower portion of the pocket 14 as shown in FIG. 1.

The latch element 3 merges into the actuating lever 10 as may be seen in FIG. 1 and the stop surface 15 on projection 16 merges into a sliding surface 14a at the end of which is formed a locking notch or recess 12 which is engageable with a locking bolt 13 fixed within the pocket 14.

The liner or partially spherical member 23 is secured in the jaw opening 24 by a tension pin 25 which bears against one end of the liner as shown. The liner 23 is shaped to receive the coupling pin 2 which is upon the implement or machine to be attached to the tractor.

In order to simplify fabrication of the coupling hook according to the present invention the hook member 1 which includes the pocket 14 and the hook opening 24 may be assembled from two halves, one of which is shown in FIG. 2, made as individual drop or die forgings and subsequently welded together. This structure would also eliminate the copying or conforming process in making the bearings for the liner 23 since the spherical shape required for the liner is calibrated and formed during the forging operation. The tension pin 25 and the bore for receiving the tension pin can also be eliminated because the end stop for the liner 23 can be integrally formed in the forgings of the hook member halves. Similarly, the bolt which forms the spring mounting 18 could be replaced by a pair of inwardly projecting pegs on the halves of the hook member such that these pegs abut in end-to-end relationship when the halves are assembled to form a spring mount.

When it is desired to attach a machine or piece of equipment to the three-point linkage of a tractor, the tractor is driven in the reverse direction toward the machine and its lower guide with a coupling hook 1 is pushed beneath the coupling pin 2 on the machine. As the guide member is subsequently raised in a manner as known in the art, the coupling pin 2 will be forced downwardly into the hook opening 24. During this downward movement of the pin 2, the pin will apply a force to the inclined nose 2a of the latch element so as to apply a tilting or pivoting force by the lock releasing face 22 on the latch element 3 against the fulcrum 21 in passage 5. The latch element 3 is thus displaced and pivoted upwardly against the force of spring 19 so that that portion of the latch element 3 directed toward the actuating lever 10 moves upwardly in the catch hook pocket 14 and the locking engagement between notch 12 and locking bolt 13 is thus released. This tilting or pivoting movement of the latch member 3 as described occurs simultaneously with an axial sliding movement of the latch element 3 and actuating lever 10 in the hook pocket 14. During this pivotal and axial movement of latch member 3 as guided in the passage 5, the curved surface 7 of the latch element 3 will slide along fulcrum 8 on the counter surface 6 in the pocket until the coupling pin 2 is completely seated and supported in the liner 23. Upon seating of the pin, the spring 19 which has been tensioned during the opening movement of latch element 3 now acts to pull the latch element 3 together with actuating lever 10 downwardly into the operative locking position as shown in FIG. 1. The force exerted by spring 19 will cause the latch element 3 to perform a pivoting movement with the curvilinear face 7 sliding along guide face 4 and the sliding face 14a on the bottom surface of the latch element will slide over the locking bolt 13 until the latch element nose 2a has been pushed over the coupling pin 2 and recess 12 comes into operative locking engagement with the locking bolt 13. The locking mechanism is now closed.

It is clearly apparent that with the locking mechanism in its closed position any vibrating, moving or pivoting of the coupling pin during operations cannot cause accidental disengagement or release of the mechanism because any movement of the pin 2 which might act in the direction of opening the mechanism would merely cause the curved surface 7 of the latch element to be pressed more firmly against guide surface 4 and sliding displacement of the latch element 3 is impossible because of the positive locking engagement between the recess 12 and the locking bolt 13. Further, any pivoting movement of the pin 2 about its own axis in the direction toward the tip of the hook member 1 would merely cause the latch element 3 to advance still further into the operative locking position.

The opening or release position of the latch element 3 is limited by the end stop 15 engaging with the locking bolt 13. Closing or locking movement of the latch element is terminated when the stop 17 engages with the surface 20 in the pocket 14.

In order to open the mechanism by means of a traction cable in a manner as known in the art, the cable which is attached to the eye 11 of the actuating lever is raised so as to raise the actuating lever which will release the locking engagement between the recess 12 and the bolt 13. The latch element 3 is now free to slide by its curved surface 7 along the fulcrum 8 while the element is supported by its lock releasing surface 22 which at the same time is sliding over the fulcrum 21. The latch element 3 is thus moved into the pocket 14 through the passage 5 until the coupling pin 2 has been released by the nose 2a of the latch element.

After the coupling pin has been completely coupled within the coupling hook the traction cable is released by the tractor operator and the locking mechanism will close automatically as described above.

The short lever arm of the latch element 3 projects into the hook opening 24 and the longer lever arm is received in the pocket 14. As result, it is possible to eliminate any special structure for positioning the liner 23 in the region of the latch element since the position of the element will not permit any outward movement of the bearings for the liner.

It is further apparent that the presence of the stops 15 and 17 enables the latch element-actuating lever member to be moved into or out of the hook opening within limits defined between the stop surface 20 and the locking bolt 13. Further, by utilizing the projection 16 upon which stop surfaces 15 and 17 are formed as a spring mount, the actuating lever together with the latch element is continuously urged into the operative locking position by the spring 19 but the latch element is capable of opening automatically during the coupling operation.

Thus it can be seen that the present invention has disclosed a simple but improved locking mechanism for a coupling hook which not only incorporates a minimum of components but is effective and reliable in operation.

It will be understood that this invention is susceptible to modification in order to adapt it to different usages and conditions, and accordingly, it is desired to comprehend such modifications within this invention as may fall within the scope of the appended claims.

What is claimed is:

1. A coupling hook for a guide-member of a three-point attachment of a tractor comprising a hook member having a hook opening and a pocket opening to a surface of the hook member, there being a passage between said pocket and hook opening, an arcuate latch element displaceable into said hook opening through said passage to block a coupling pin in said hook opening in a locked position and displaceable to a position to release the coupling pin, said latch element having an actuating lever rigidly attached thereto and projecting outwardly through the pocket opening, said latch element having inner and outer curvilinear surfaces opposed from each other, said hook member having a first fulcrum in the vicinity of said pocket opening engageable with said inner curvilinear surface and a second fulcrum in the vicinity of said passage engageable with said outer curvilinear surface, a bolt within said pocket and there being a notch in said outer curvilinear surface engageable with said bolt, said notch engaging said bolt and said outer curvilinear surface engaging said second fulcrum when said latch element is in its locked position.

2. A coupling hook as claimed in claim 1 wherein said actuating lever extends in a direction away from said hook opening.

3. A coupling hook as claimed in claim 1 and means on the outer curvilinear surface of the latch element for limiting the displacement of said latch element to the locking and release positions.

4. A coupling hook as claimed in claim 3 wherein said limiting means comprises a projecting portion having one side engaging said bolt to limit displacement to the release position and having another side engaging said second fulcrum to limit displacement to the locked position.

5. A coupling hook as claimed in claim 4 and spring means attached to said projecting portion to urge said outer curvilinear surface toward said second fulcrum and said bolt.

* * * * *